United States Patent [19]

Kikuchi

[11] Patent Number: 5,754,379
[45] Date of Patent: May 19, 1998

[54] DISK CARTRIDGE

[75] Inventor: Shuichi Kikuchi, Miyagi, Japan

[73] Assignee: Sony Corporation, Tokyo, Japan

[21] Appl. No.: 747,899

[22] Filed: Nov. 13, 1996

[30] Foreign Application Priority Data

Nov. 22, 1995 [JP] Japan ................. 7-304013

[51] Int. Cl.$^6$ ........................................... G11B 23/033
[52] U.S. Cl. ........................................... 360/133
[58] Field of Search ........................................... 360/133

[56] References Cited

U.S. PATENT DOCUMENTS

| | | | |
|---|---|---|---|
| 4,757,412 | 7/1988 | Iizuka et al. | 360/133 |
| 4,812,937 | 3/1989 | Nemoto et al. | 360/133 |
| 4,855,857 | 8/1989 | Ono et al. | 360/133 |
| 5,090,010 | 2/1992 | Takahashi | 360/133 |
| 5,103,363 | 4/1992 | Yamada et al. | 360/133 |
| 5,241,441 | 8/1993 | Yamada et al. | 360/133 |
| 5,326,608 | 7/1994 | Ikebe et al. | 360/133 |

*Primary Examiner*—Robert S. Tupper
*Attorney, Agent, or Firm*—William S. Frommer; Alvin Sinderbrand

[57] ABSTRACT

A disk cartridge includes a center plate attached to an inner side of a cartridge casing which rotatably houses a disk utilized as a recording medium. The disk cartridge is mounted so as to be interposed between the inner side of the cartridge casing and a leading end of a spindle shaft of a disk drive for preventing abrasion or damage to the casing. The center plate is formed by cutting processing of a sheet roll of layered plate material. This roll of plate material is formed with a core of paper having an adhesive layer for mounting applied to one side thereof and a super abrasion resistant synthetic resing applied on the other side thereof for contacting the leading edge of the spindle shaft.

24 Claims, 5 Drawing Sheets

DISK CARTRIDGE

BACKGROUND OF THE INVENTION

The present invention relates to a disk cartridge. Specifically, the present invention relates to a 3.5 inch floppy disk cartridge utilized for data storage and the like.

DESCRIPTION OF THE RELATED ART

Floppy disk cartridges such as a 3.5 inch floppy disk are commonly used for data storage in various type of electronic devices. FIG. 6 shows an example of such a conventional floppy disk cartridge wherein a center plate 103 is attached to an inner surface of a cartridge case 102 that rotatably accommodates a disk 101 as a recording medium. When the disk cartridge is loaded into a disk drive 201 a spindle shaft 202 of the disk drive 201 is accommodated in an insertion opening 106 so as to have a leading end thereof in contact with the above-mentioned center plate 103.

Rotation of the spindle shaft 202 causes the disk 101 to rotate. Since the leading edge of the spindle shaft 202 is prevented from directly contacting the inside of the cartridge case 102 due to the positioning of the center plate 103, scratching or abrasion of the cartridge case 102 is avoided.

Referring to FIG. 7, it may be seen that such a center plate 103 may be formed as a layered structure, which may be formed of a high polymer polyethylene having an adhesive layer 103b disposed on one side thereof. The adhesive layer 103b serves to attach the center plate 103 to the inner surface of the cartridge case 102.

FIG. 8 shows a manufacturing process for such a center plate 103. As may be seen the center plate 103 is cut from a roll of super high polymer polyethylene 301 comprised of a elongate sheet of super high polymer polyethylene 103a having a thickness of substantially 100 micron meters. The adhesive layer 103b is preformed thereon and further has a layer of protective paper, or the like, 103c disposed over the adhesive layer 103b.

The cutting process will be explained with reference to FIG. 9. A feeder 302 moves the leading end of the polyethylene roll 301 into the cutter 304 while a separation member 303 separates the layer of protective paper 103c before cutting processing. Then the super high polymer polyethylene sheet 103a is cut by a blade 304a of the cutter 304 into pieces of the appropriate size. The pieces are gathered by a pick-up machine 305 and adhered respectively to the inner surface of a cartridge case 102. The cutter 304 further includes a table 304b for supporting the polyethylene roll 301 during processing and a weight panel 304c.

There are however, drawbacks to the above described process in that such super high polyethylene material is expensive, raising the costs of producing such a center plate. Further, such a super high polymer material is highly brittle, though tough and difficult to cut. Thus, the edge of the cutter blade 304a wears out requiring frequent replacement of blades.

A further drawback is encountered due to the weak adhesion between the adhesive layer 103b and the polyethylene sheet 103a, the adhesive is worn off during cutting which slows down the cutter blade 304a due to increased friction and necessitates that the blade 304a and the table 304b be cleaned often. Thus overall processing speed is reduced and costs are increased.

Thus it has been required to provide a disk cartridge including a center-plate which may be efficiently manufactured while overcoming the above-described drawbacks. It is also desirable to provide a material for manufacturing such center plates which facilitates faster cutting processing and inhibits separation of the sheet material from the adhesive layer.

SUMMARY OF THE INVENTION

Thus, it is an object of the present invention to overcome the drawbacks of the related art.

It is a further object of the invention to provide a According to one aspect of the invention, there is provided a disk cartridge including a center plate which may be efficiently manufactured by providing a material for manufacturing such center plates which facilitates faster cutting processing and inhibits separation of the sheet material from the adhesive layer.

According to one aspect of the invention, there is provided a disk cartridge, comprising a cartridge casing rotatably housing a disk type as a recording medium, a center plate attached to an inner side of the cartridge casing positioned so as to be interposed between the inner side of the cartridge casing and a leading edge of a spindle shaft of a disk drive device, wherein the center plate is formed of a layered plate material including a core layer formed of paper, an adhesive layer applied to a first side of the core layer, and a protective layer formed of highly abrasion resistant material applied to a second side of the core layer, opposite the first side.

DESCRIPTION OF THE PREFERRED EMBODIMENT

Figure 1:
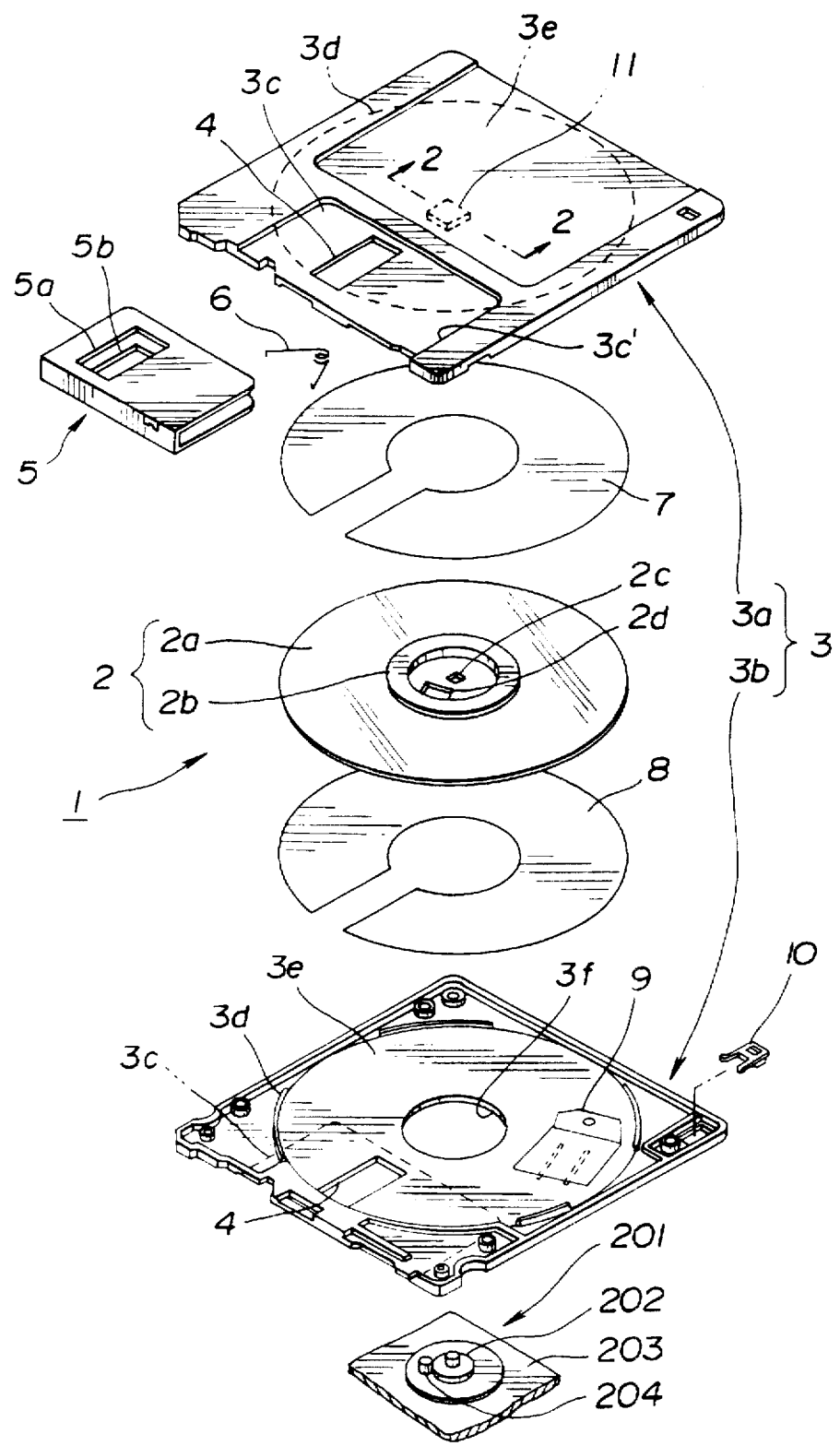
FIG. 1 is an exploded perspective view of a disk cartridge.

Hereinbelow, a preferred embodiment of the invention will be explained in detail with reference to the drawings. Referring to FIGS. 1–5, the a disk cartridge according to the invention includes a disk type recording medium 2 a cartridge casing, or shell, 3 rotatably accommodating the disk 2. A shutter 5 is slidably provided on one edge of the cartridge casing 3 so as to be movable to open and close an aperture 4 formed in the cartridge casing for facilitating read/write operations by a disk drive 201. The shutter includes upper and lower access openings 5a, 5b corresponding to the position of the aperture 4. As may be seen in FIG. 1, the disk 2 includes a recording medium 2a, for example, a resilient, magnetically coated sheet of synthetic resin concentrically mounted at a center portion thereof by a metallic hub 2b. The hub 2b is formed with an insertion opening 2c for receiving a spindle shaft 202 of a disk drive 201 (see FIG. 6).

When the disk cartridge 1 is loaded into the disk drive 201 the hub 2b is disposed on turntable 203 with the spindle shaft 202 and a drive pin 204 of the disk drive 201 being inserted into the insertion opening 2c of the hub 2b. A center plate 11 of the disk cartridge 1 is disposed on the inner surface of the cartridge casing 3 at a position corresponding to the insertion opening 2c. Thus, the center plate 11 is interposed between the distal end of the spindle shaft 202 and the inner side of the cartridge casing 3 to prevent damage thereto during use of the disk cartridge 1.

According to the present embodiment, the cartridge casing 3 is formed of upper and lower shell portions 3a, 3b made of plastic. The upper shell portion 3a includes a recess 3c for accommodating the shutter 5 and a inset circular disk support portion 3d defined in the inner surface thereof surrounded by a ring-like wall portion 3d.

Similarly to the upper shell 3a, the lower shell portion 3b includes a shutter recess 3c, an inset circular disk support portion 3d on the inner surface having a ring-like wall portion 3d therearound. Further, the lower shell portion 3b is formed with a hub receiving opening defined therethrough. According to this structure, the lower side of the hub 2b is exposed at the outer side of the disk cartridge 1.

The shutter 5 is U-shaped and biased in a closed position of the aperture 4 by a spring member 6.

Figure 2:
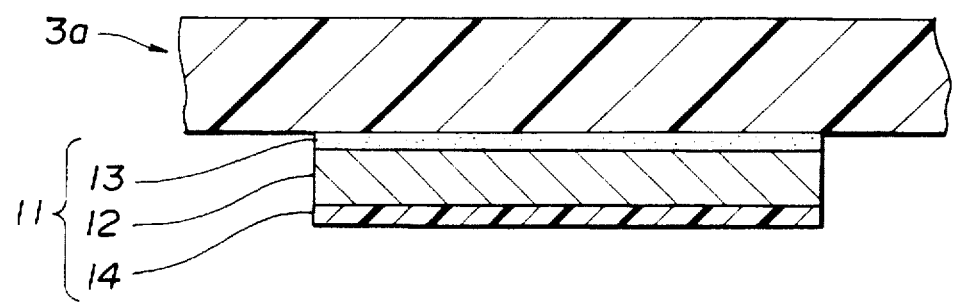
FIG. 2 is a cross-sectional view taken along line A—A of FIG. 1.

Hereinbelow, the structure of a center plate 11 for such a disk cartridge 1 according to the preferred embodiment will be explained in detail with reference to FIG. 2.

As may be seen, the center plate 11 has a layered composition including a core layer 12, an upper adhesive layer 13 and a lower protective layer 14. According to the invention, the core layer 12 may be formed of a durable paper material such as craft paper having a density of 70 g.m². According to this the adhesion layer 12 applied to the upper side of the core material bonds more strongly to such a paper core layer 12 than to a plate of polyethylene resin core material or the like. The adhesive layer 12 may be formed of acrylic resin for example.

The protective layer 14 applied to the lower surface of the core layer 12 is preferably formed of an abrasion resistant synthetic resin such as a high density polyethylene. According to the present embodiment, the protective layer is formed with a thickness of between 7 and 10 microns. The adhesive and protective layers 13, 14 may be applied by known coating methods.

The center plate composition as described hereinabove thus provides a reliable center plate material which is substantially less expensive than conventional materials. Further, according to the center plate material 11 of the invention, cutting processing may be more easily carried out since the paper core layer 12 offers less resistance to a cutter blade than conventional materials. Also, since good adhesion between the adhesive layer 13 and the paper core layer 12 is established, the adhesive material of the adhesive layer 13 will not substantially impede cutting processing operation.

Figure 3:
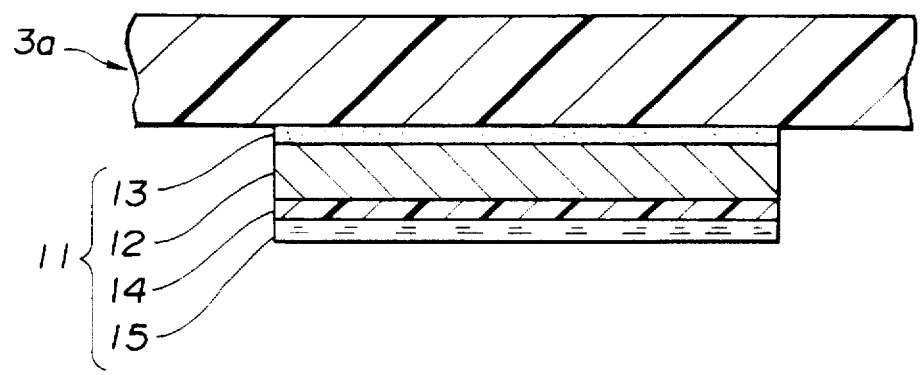
FIG. 3 shows a cross-sectional view of a first modification of a center plate according to the invention.

Next, referring to FIG. 3, a first modification of the center plate material 11 according to the invention will be described hereinbelow.

As described above in relation to the preferred embodiment, the center plate 11 according to the present modification has a layered composition including a core layer 12, an upper adhesive layer 13 and a lower protective layer 14. The core layer 12 is formed of a craft paper having a density of substantially 70 g.m². Also, the adhesive layer 12 is formed of acrylic resin for example.

The protective layer 14 at the lower surface of the core layer 12 is formed of high density polyethylene having a thickness of between 7 and 10 microns. The adhesive and protective layers 13, 14 are applied by known coating methods.

Further, according to the present modification, an additional lubricant layer 15 is applied to the lower side of the protective layer 14. Preferably, the lubricant layer 15 may be provided as a layer of silicon resin or the like, applied to the surface of the protective layer.

According to this composition, additional abrasion resistance is inexpensively provided. Thus providing a more reliable disk cartridge having a longer working life.

The center plate composition as described above thus provides a highly functional center plate material at low cost. As in the previous embodiment, cutting processing may be more easily carried out since the paper core layer 12 offers less resistance to a cutter blade than conventional materials. Also, since good adhesion between the adhesive layer 13 and the paper core layer 12 is established, the adhesive layer 13 will not interfere with cutting processing and processing speed is increased.

Figure 4:
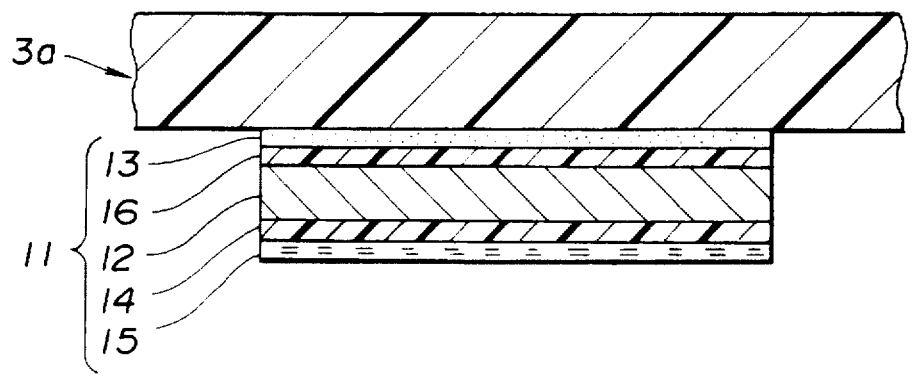
FIG. 4 is a cross-sectional view of a second modification of a center plate according to the invention.

Referring now to FIG. 4, a second modification of a material for a center plate 11 of a disk cartridge 1 will be described in detail.

As may be seen in the drawing, the present modification has a composition corresponding to the above described center plate material wherein a core layer 12, an upper adhesive layer 13 and a lower protective layer 14. The core layer 12 is formed of a craft paper having a density of substantially 70 g.m². Also, the adhesive layer 12 is formed of acrylic resin for example.

The protective layer 14 at the lower surface of the core layer 12 is formed of high density polyethylene having a thickness of between 7 and 10 microns. The adhesive and protective layers 13, 14 are applied by known coating methods.

According to the present modification, a reinforcement layer 16 is additionally provided interposed between the upper side of the paper core layer 12 and the adhesive layer 13. The reinforcement layer prevents penetration of the adhesive material of the adhesive layer into the paper material of the core layer 12. Accordingly the strength and durability of the core layer is improved. It will be noted that the reinforcement layer may be formed as a sheet of synthetic resin selected so as to provide optimal bonding properties with the adhesive used (i.e. acrylic resin).

Thus the strength and operability of the center plate 11 according to the invention is enhanced while costs are reduced.

Further, it will be noted that the above-described reinforcement layer 16 according to the present modification may be provided with or without the lubricant layer 15 applied to the lower side of the protective layer 14. Preferably, the lubricant layer 15 may be provided as a layer of silicon resin or the like, applied to the surface of the protective layer in addition to the reinforcement layer 16, as shown in FIG. 4.

Now, with reference to FIG. 5, a third modification of a center plate 11 structure for a disk cartridge 1 will be described hereinbelow.

Figure 5:
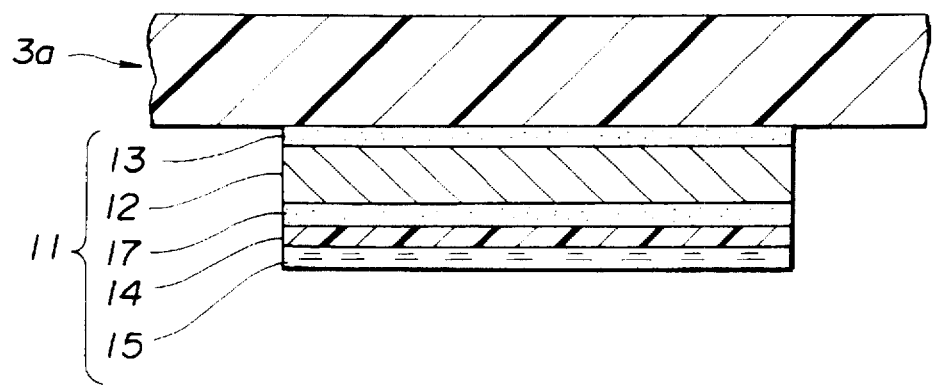
FIG. 5 illustrates a cross-sectional view of a third modification of a center plate according to the invention.
Figure 6:
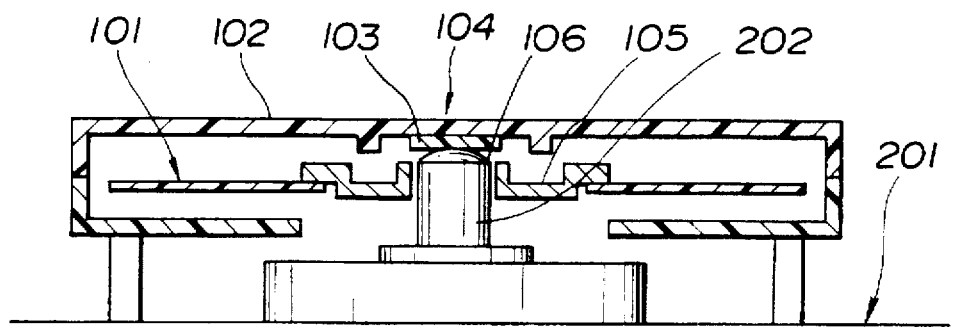
FIG. 6 is a cross-sectional diagram of a conventional 3.5 inch floppy disk cartridge.
Figure 7:
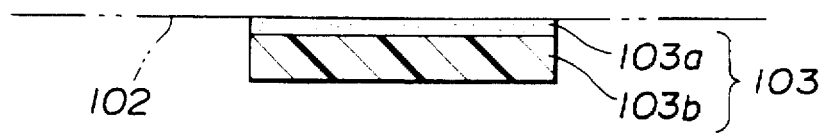
FIG. 7 shows an enlarged cross-sectional view of a center plate provided in the floppy disk cartridge of FIG. 6.
Figure 8:
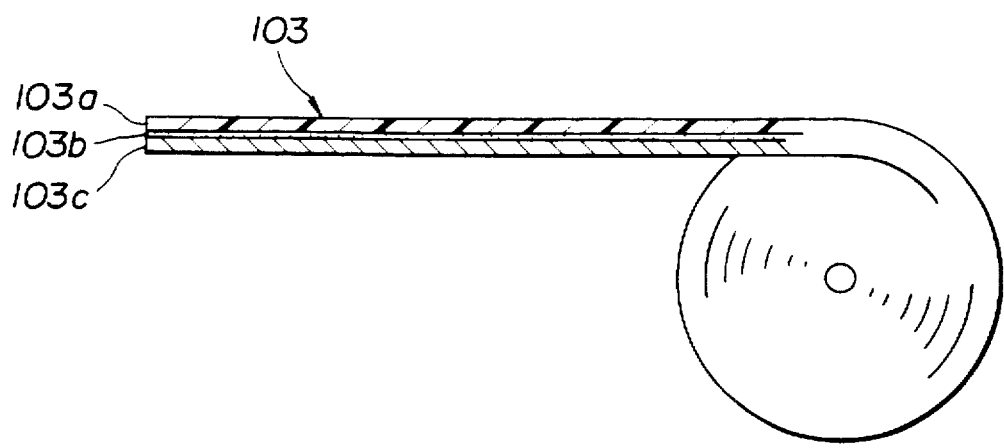
FIG. 8 is a cross-sectional view of a sheet roll of plate material utilized for manufacture of a center plate of a disk cartridge.
Figure 9:
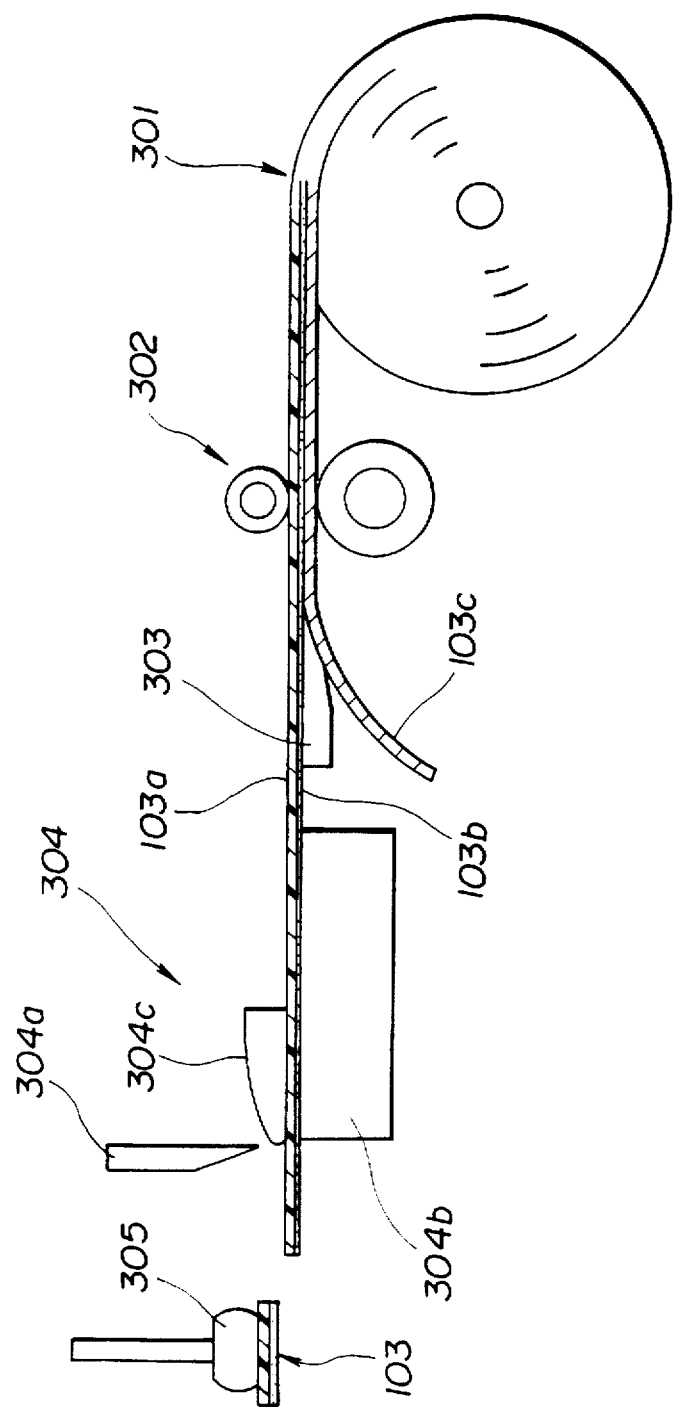
FIG. 9 is schematic diagram illustrating a cutting processing operation applied to the sheet roll of plate material during center plate manufacture.

As may be seen in FIG. 5, the present modification includes a core layer 12, an upper adhesive layer 13 and a lower protective layer 14. The core layer 12 is formed of a craft paper having a density of substantially 70 g.m$^2$. The adhesive layer 12 is formed of acrylic resin for example.

The protective layer 14 at the lower surface of the core layer 12 is formed of high density polyethylene having a thickness of between 7 and 10 microns. The adhesive and protective layers 13, 14 are applied by known coating methods.

Now, referring to FIG. 5, the present modification additionally provides a second reinforcement layer 17 formed as a sheet of synthetic resin disposed between the core layer 12 and the protection layer 14. According to this, additional rigidity and strength is imparted to the surface of the center plate 11 which contacts the end of the spindle shaft 202 of the disk drive and superior bonding may be achieved between the core layer and the protection layer.

According to the present modification the above-described reinforcement layer 16 and the lubricant layer 15 may be provided in addition to the second reinforcement layer 17 as shown in FIG. 5.

A reinforcement layer 16 may be provided interposed between the upper side of the paper core layer 12 and the adhesive layer 13 for preventing penetration of the adhesive material of the adhesive layer into the paper material of the core layer 12 and enhancing strength and durability of the core layer. The reinforcement layer 16 is formed as a sheet of synthetic resin selected so as to provide optimal bonding properties with the adhesive used (i.e. acrylic resin). The lubricant layer 15 may be formed as a coating of silicone resin as in the previously described modifications.

Thus, according to the present invention as described herein above, there is provided a reliable center plate material which is substantially less expensive than conventional materials. Further, according to the center plate material 11 of the invention, cutting processing may be more easily carried out since the paper core layer 12 offers less resistance to a cutter blade than conventional materials. Also, since good adhesion between the adhesive layer 13 and the paper core layer 12 is established, the adhesive material of the adhesive layer 13 will not substantially impede cutting processing operation.

Further, according to the structure of the invention as herein set forth, according to the present modification, an additional lubricant layer 15 is applied to the lower side of the protective layer 14. Preferably, the lubricant layer 15 may be provided as a layer of silicon resin or the like, applied to the surface of the protective layer, thus additional abrasion resistance is inexpensively provided.

Further, when a reinforcement layer 16 is additionally provided interposed between the upper side of the paper core layer 12 and the adhesive layer 13. The reinforcement layer prevents penetration of the adhesive material of the adhesive layer into the paper material of the core layer 12. Accordingly the strength and durability of the core layer is improved.

Also, according to the above-described third modification, when a second reinforcement layer is also provided, additional strength durability and integrity of the center plate material may be inexpensively achieved.

Thus the strength and operability of a center plate 11 according to the invention is enhanced while costs are reduced.

It will be noted that, although the preferred embodiment is set forth in terms of a disk cartridge including a center plate 11, however the present invention may be embodied in various different ways without departing from the principle of the invention as herein set forth. For example, the core layer 12 according to the invention may be formed of glassine paper or the like, rather than craft paper. Indeed, the material of the core layer need not be limited to natural papers at all and may be comprised of synthetic compounds having the desired properties.

The present invention in not limited only to the description as herein disclosed but may be modified and embodied in other ways without departing from the scope or inventive concept of the invention as set forth above.

What is claimed:

1. A disk cartridge, comprising:

a cartridge casing rotatably housing a disk type as a recording medium;

a center plate attached to an inner side of said cartridge casing positioned so as to be interposed between said inner side of said cartridge casing and a leading edge of a spindle shaft of a disk drive device; wherein said center plate is formed of a layered plate material including; a core layer formed of paper;

an adhesive layer applied to a first side of said core layer; and a protective layer formed of highly abrasion resistant synthetic resin applied to a second side of said core layer, opposite said first side.

2. A disk cartridge as set forth in claim 1, wherein said core layer is formed of craft paper having a density of 70 g.m$^2$.

3. A disk cartridge as set forth in claim 1, wherein said adhesive layer comprises a coating of acrylic resin.

4. A disk cartridge as set forth in claim 1, wherein said protective layer is formed of high density polyethylene having a thickness of between 7 and 10 microns.

5. A disk cartridge as set forth in claim 1, wherein said core layer is formed of craft paper having a density of 70 g.m$^2$ and said protective layer is formed of a high density polyethylene resin having a thickness of between 7 and 10 microns.

6. A disk cartridge as set forth in claim 5, wherein said adhesive layer comprises a coating of acrylic resin.

7. A disk cartridge as set forth in claim 1, wherein said center plate material further includes a lubricant layer applied to an exposed surface side of said protective layer.

8. A disk cartridge as set forth in claim 7, wherein said lubricant layer is formed as a layer of silicone resin applied to said exposed surface said protective layer.

9. A disk cartridge as set forth in claim 5, wherein said center plate material further includes a lubricant layer applied to an exposed surface side of said protective layer.

10. A disk cartridge as set forth in claim 9, wherein said lubricant layer is formed as a layer of silicone resin applied to said exposed surface said protective layer.

11. A disk cartridge as set forth in claim 1, further comprising a first reinforcement layer provided between said core layer and said adhesive layer.

12. A disk cartridge as set forth in claim 11, wherein said reinforcement layer is formed as a sheet of synthetic resin selected so as to provide optimal bonding properties with an adhesive material utilized as said adhesive layer.

13. A disk cartridge as set forth in claim 12, wherein said adhesive layer is formed of acrylic resin.

14. A disk cartridge as set forth in claim 5, further comprising a first reinforcement layer provided between said core layer and said adhesive layer.

15. A disk cartridge as set forth in claim 14, wherein said reinforcement layer is formed as a sheet of synthetic resin selected so as to provide optimal bonding properties with an adhesive material utilized as said adhesive layer.

16. A disk cartridge as set forth in claim 15, wherein said adhesive layer is formed of acrylic resin.

17. A disk cartridge as set forth in claim 1, further including a second reinforcement layer formed as a sheet of synthetic resin disposed between said core layer and said protection layer.

18. A disk cartridge as set forth in claim 1, wherein said core layer 12 is formed of glassine paper.

19. A disk cartridge as set forth in claim 5, further including a second reinforcement layer formed as a sheet of synthetic resin disposed between said core layer and said protection layer.

20. A disk cartridge as set forth in claim 5, wherein said core layer 12 is formed of glassine paper.

21. A disk cartridge as set forth in claim 11, further including a second reinforcement layer formed as a sheet of synthetic resin disposed between said core layer and said protection layer.

22. A disk cartridge as set forth in claim 11, wherein said core layer 12 is formed of glassine paper.

23. A disk cartridge as set forth in claim 1, wherein said paper material includes at least craft paper.

24. A disk cartridge as set forth in claim 1, wherein said synthetic resin protective layer is in the form of a polyethylene layer.

* * * * *